US012085274B1

(12) United States Patent
Spiro

(10) Patent No.: US 12,085,274 B1
(45) Date of Patent: Sep. 10, 2024

(54) ORIENTATION SPECIFIC LUMINAIRE

(71) Applicant: Exposure Illumination Architects, Inc., Scottsdale, AZ (US)

(72) Inventor: Daniel S. Spiro, Scottsdale, AZ (US)

(73) Assignee: EXPOSURE ILLUMINATION ARCHITECTS, INC., Scottsdale, AZ (US)

( * ) Notice: Subject to any disclaimer, the term of this patent is extended or adjusted under 35 U.S.C. 154(b) by 0 days.

(21) Appl. No.: 18/436,081

(22) Filed: Feb. 8, 2024

Related U.S. Application Data

(63) Continuation-in-part of application No. 18/401,448, filed on Dec. 30, 2023.

(60) Provisional application No. 63/548,311, filed on Nov. 13, 2023.

(51) Int. Cl.

| | |
|---|---|
| ***F21V 5/00*** | (2018.01) |
| ***F21V 14/06*** | (2006.01) |
| ***F21V 21/008*** | (2006.01) |
| ***F21Y 113/00*** | (2016.01) |
| ***F21Y 115/10*** | (2016.01) |

(52) U.S. Cl.
CPC .............. *F21V 5/007* (2013.01); *F21V 14/06* (2013.01); *F21V 21/008* (2013.01); *F21Y 2113/00* (2013.01); *F21Y 2115/10* (2016.08)

(58) Field of Classification Search
CPC ................................ F21V 5/007; F21V 14/06
See application file for complete search history.

(56) References Cited

U.S. PATENT DOCUMENTS

| | | | | |
|---|---|---|---|---|
| 6,210,018 | B1 * | 4/2001 | Kassay | F21V 15/01 362/225 |
| 10,323,824 | B1 * | 6/2019 | Lim | F21V 5/02 |
| 2010/0270933 | A1 * | 10/2010 | Chemel | H05B 47/155 315/130 |
| 2010/0296285 | A1 * | 11/2010 | Chemel | F21V 21/00 362/249.1 |
| 2012/0307503 | A1 * | 12/2012 | Wilcox | G02B 19/0014 362/308 |
| 2016/0348855 | A1 * | 12/2016 | Zampini | G02B 19/0014 |
| 2017/0175953 | A1 * | 6/2017 | Van Boven | F21K 9/65 |
| 2017/0257925 | A1 * | 9/2017 | Forbis | F21S 8/026 |
| 2018/0231200 | A1 * | 8/2018 | Hierzer | F21V 29/83 |
| 2018/0292071 | A1 * | 10/2018 | Tarsa | F21V 5/08 |

* cited by examiner

*Primary Examiner* — Bryon T Gyllstrom
(74) *Attorney, Agent, or Firm* — XSENSUS LLP

(57) ABSTRACT

An orientation specific luminaire is coupled to lensed optics configured to illuminate vertical and horizontal surfaces within elongated spaces at predetermined light intensity levels, where needed, and with predetermined uniformity ratios within a surface and between surfaces. The orientation specific luminaire includes an orientation mounting hub, the orientation of which is user settable such that the lensed optics emit light from the luminaire's light sources to illuminate vertical and horizontal surfaces within elongated spaces at predetermined light intensity levels.

30 Claims, 9 Drawing Sheets

ORIENTATION SPECIFIC LUMINAIRE

CROSS-REFERENCE TO RELATED APPLICATIONS

The present application has common inventorship with, and contains subject matter related to that disclosed in U.S. Pat. No. 11,788,692. The present application claims the benefit of the earlier filing date of U.S. Provisional Application 63/548,311, filed on 13 Nov. 2023, the entire contents of which being incorporated herein by reference. The present application is a continuation-in-part of, and claims priority to, U.S. Utility patent application Ser. No. 18/401,448, filed 30 Dec. 2023, as well as U.S. patent application Ser. No. 18/433,140 (filed 5 Feb. 2024), which is a continuation-in-part of U.S. patent application Ser. No. 18/406,136 (filed 6 Jan. 2024), which is a continuation-in-part of U.S. patent application Ser. No. 18/381,231 (filed 18 Oct. 2023, now U.S. Pat. No. 11,901,718), the entire contents of each which being incorporated herein by reference.

BACKGROUND

Technical Field

The present disclosure relates to luminaires, and more particularly luminaires that illuminate vertical and horizontal surfaces.

Discussion of Background

Low and high bay luminaires are often mounted at mounting heights that typically range between 15 feet and 50 feet above a finished floor. Today, the most common luminaire light source is based on a set of light emitting diodes (LEDs). The LED light source is planar and hosts an array of individual LEDs, with the light emitted from this planar LED light source directed toward the floor below. The luminaire is typically suspended from a structure above by cables, chains, or a conduit.

As discussed in U.S. patent application Ser. No. 18/401,448 (See FIG. 1a and FIG. 1b therein) inefficiencies exist with present-day vertical illumination provided by low and highbay luminaires when mounted above an elongated space such as a racked aisle. FIG. 1a of U.S. patent application Ser. No. 18/401,448 is for one main brand highbay luminaire, and FIG. 1b of U.S. patent application Ser. No. 18/401,448 is for another main brand luminaire. The racked aisle is an elongated space with at least one vertical surface, and the figures are shown from the perspective of facing the one vertical surface, with a person walking in an aisleway which runs from left to right in the figures. Two luminaires are shown suspended above the racked aisle spaced apart by a distance. The luminaire's height from the floor is H1, and H2 is the top edge of the vertical surface of the rack illuminated by the luminaires. These figures show that the highest vertical light levels emitted by the luminaire across the face of the vertical plane occurs well above an adult human eye level, contrary to where it should be. A band of higher light intensity should extend above and below the adult human eye level, in a range, along the length of the face of the vertical surface. Herein, the range is an inclusive range of 3' above the finished floor 1 to 7' above the finished floor 1—this range of 3' to 7' is sometimes referred to herein as "the inclusive range" and is intended to cover a height above finished floor of the aisleway on the vertical surface that defines one side of the aisleway, the vertical surface usually being racks of goods, or a wall. A portion of the energy (region 6*a*) associated with the exceedingly intense light levels is wasteful. Further, the human eye is configured to home in on well-lit surfaces. As a result, surfaces within the range in these figures is relatively dim.

These figures also show a poor vertical uniformity ratio between maximum light levels that occur in a region in which light levels exceed 60% of a target, and minimum light levels in a region in which light is below 60% of a target. Most striking is the relatively short distance between an intense light level surface and a dim lit surface nearby. According to the IESNA guidebook for indoor illumination, an acceptable ratio between maximum to minimum light levels is 3:1. The present figures exceed this ratio as is evident from light levels seen in Tables 1 and 2, as will be discussed below.

Tables 1 and 2 show light levels, in foot candles, on 2.5'×4' (height χ length) subregions of a vertical surface of respective conventional lighting systems over aisleways. In these examples, the height of the vertical surface is 22.5' although a similar distribution is present for higher vertical surfaces. In each of Tables 1 and 2 eye level is just above the second row from the bottom. As can be seen, while the light levels at eye levels are around 30 to 32 foot candles, subregions above eye level far exceed the light levels at eye level, with some subregions reaching over 100 foot candles. In the case of Example 1 (Table 1), the peak light intensity is not near eye level, where the goods for sale are often located, but well above eye level, around 17.5'. Thus, significant energy is wasted illuminating less interesting portions of the vertical surface, and the unnecessarily high light intensities gives rise to more glare than desirable for the consumer walking in the aisleway. In the case of Example 2 (Table 2) the luminaires are tilted toward the vertical surface, and have lower output candle power. These combine to lower the peak level to about 15' above the floor (6$^{th}$ row from the bottom), but also cause a much larger region of lower light intensity toward the top of the vertical surface (see the top three rows) as well as create "hot spots" (light exceeding 60% of target) on the vertical surface with large bright subregions compared to surrounding dim subregions: compare the bright subregions at the 3$^{rd}$ and 4$^{th}$ rows from the top and in the 3$^{rd}$/4$^{th}$ columns (first bright subregions with illumination levels as high as 92 foot candles), and 7$^{th}$/8$^{th}$ columns (second bright subregions with illumination levels as high as 96 foot candles) as compared to adjacent dim subregion (light levels below 60% of target) such as at the 3$^{rd}$ row from the top and 5$^{th}$/6$^{th}$ columns (20 and 14 foot candles). Furthermore, in example 2 (Table 2) the upper portion of the vertical surface (see the top two rows) are dimly illuminated. This variation in illumination level is highly disparate with hot spot subregions at 96 foot candles, and dim subregions in the single digits. As with the case of example 1 (Table 1), the peak light intensity is well above eye level. Thus merely tilting the luminaire toward the vertical surface, and adjusting the output levels of adjacent luminaires does not provide the ideal illumination pattern on the vertical surface of an elongated space, and the does not create a peak illumination at eye level.

TABLE 1

Example 1, Light Levels (foot candles) in subregions 2.5' x 4' subregions of vertical surface

| | | | | | | | | | |
|---|---|---|---|---|---|---|---|---|---|
| 11 | 13 | 17 | 15 | 12 | 12 | 15 | 17 | 14 | 12 |
| 41 | 67 | 107 | 88 | 49 | 45 | 81 | 109 | 72 | 42 |

TABLE 1-continued

| Example 1, Light Levels (foot candles) in subregions 2.5' x 4' subregions of vertical surface | | | | | | | | | |
|---|---|---|---|---|---|---|---|---|---|
| 56 | 70 | 95 | 84 | 61 | 59 | 79 | 97 | 75 | 57 |
| 51 | 63 | 77 | 71 | 55 | 53 | 69 | 77 | 65 | 52 |
| 46 | 49 | 51 | 50 | 48 | 48 | 50 | 51 | 49 | 46 |
| 39 | 38 | 38 | 38 | 38 | 39 | 38 | 38 | 38 | 39 |
| 31 | 31 | 30 | 31 | 31 | 31 | 31 | 31 | 31 | 31 |
| 26 | 27 | 27 | 27 | 26 | 26 | 27 | 27 | 27 | 26 |

TABLE 2

| Example 2, Light Levels (foot candles) in subregions 2.5' x 4' subregions of vertical surface | | | | | | | | | |
|---|---|---|---|---|---|---|---|---|---|
| 8 | 9 | 10 | 10 | 8 | 8 | 9 | 10 | 9 | 8 |
| 11 | 12 | 16 | 14 | 11 | 11 | 13 | 16 | 13 | 11 |
| 12 | 36 | 92 | 74 | 20 | 14 | 59 | 96 | 53 | 13 |
| 45 | 56 | 68 | 64 | 49 | 47 | 62 | 68 | 59 | 45 |
| 48 | 46 | 45 | 45 | 47 | 48 | 45 | 45 | 45 | 48 |
| 37 | 37 | 37 | 37 | 37 | 37 | 37 | 37 | 38 | 37 |
| 30 | 30 | 32 | 32 | 30 | 30 | 31 | 32 | 31 | 30 |
| 27 | 27 | 28 | 28 | 27 | 27 | 27 | 28 | 27 | 27 |

Technical Problems

As recognized by the present inventor, a deficiency of present-day luminaires installed in elongated spaces (such as over aisleways) is that the emitted light forms "hot spots" over the vertical surfaces that define the elongated space. The light emitted is cast on surfaces well above eye level for an adult human, and thus is not distributed in an efficient manner. Furthermore, another issue of ceiling-supported luminaires is their respective spacing because ineffective spacing often results in uncomfortable glare as experienced by occupants in the aisleway.

In view of the above, there are four primary constraints that architects, engineers, and lighting designers face when designing the illumination of elongated spaces with low and high bay luminaires. These constraints include:

1. Luminaire selection is decided based on light dispersion patterns dictated by the luminaire's form, thus limiting the selection of luminaire/s due to their form.
2. More than one mounting point to a support structure is required for most luminaires.
3. Inability to illuminate horizontal and vertical surfaces with a high degree of uniformity, regardless of the luminaire's form.
4. The most intense light falls on a portion of a vertical surface that is well above an adult human's eye level, and with some applications a portion of the light emitted is perceived as direct glare.

Solutions

According to one non-limiting aspect of the present disclosure, the present innovation solves the luminaire form driven optical constraints by introducing orientation specific optical lens/es over the LED light source/s. The use of orientation specific optics can be comprised in conjunction with at least one of, a mechanical orientation mounting device and a heat dissipating structure with coupled light sources and optical lens/es configured to rotate horizontally about a driver housing.

Other solutions are provided throughout the detailed description that follows.

SUMMARY

According to an aspect of the present disclosure, an orientation specific lensed optics disposed over a light source of a luminaire illuminates vertical and horizontal surfaces regardless of the luminaire form. The luminaire is coupled to a mounting device and the mounting device is free to rotate about its vertical axis to align the luminaire with other like luminaires and/or room geometry while the mounting device is coupled to a structure above by a single point of attachment.

The Orientation Specific Luminaire—Illuminating elongated spaces such as narrow walkways with adjacent high vertical surface/s is known to be difficult. The orientation specific luminaire is designed to overcome this illumination difficulty. The orientation specific luminaire is coupled to a plurality of lenses. The luminaires lenses' optical design enables illuminating surfaces within elongated spaces no matter the space geometry.

Within the elongated space, mounting the orientation specific luminaire coupled to the lensed optics requires orienting the luminaire in relation to at least one vertical surface. The orientation of the luminaire can take place when a luminaire light source is electrified or unelectrified.

Orienting the luminaire can be done by directly coupling the luminaire to a support structure with optimal mounting orientation or by employing an intermediate orientation device/s. The intermediate orientation device/s can be coupled to the luminaire's support structure and/or to the luminaire.

The Luminaire's Light Source—The luminaire's light source can include a plurality of planar LED lamps that couple to a retaining surface. The retaining surface can be a planar board or a luminaire planar surface that faces the floor below. Most commonly, the planar board with a plurality of LED lamps is configured to couple the luminaire's planar surface that faces the floor below.

The plurality of the coupled lamps is arranged on at least one planar surface in substantially the same orientation. The lamps arranged on the retaining planar surface can be configured in at least one of, a concentric and an orthogonal fashion. The retaining planar surface can be square, round, rectangular, or any irregular form. The lamps' size, form, luminosity, chromaticity, color temperature, and input power can be substantially the same. In at least one embodiment, a lamp/s with at least one different property and/or functionality can couple to the retaining planar surface.

The Luminaire's Lensed Optics—At least two optical lenses can be placed over at least two lamps that are coupled to a planar lamp retaining surface. As will be discussed herein, the lenses can have 3D structure the produce pre-configured optical light emittance properties. The lenses can be configured as a stand-alone structure that is placed over a single LED lamp, or as a structure that can include a plurality of lenses that are dedicated to and placed over a plurality of LED lamps. The latter structure can be shaped to complement the form of the lamp retaining planar surface.

All or the plurality of the floor facing orientation specific luminaire's lenses can employ substantially the same optics above the same plurality of lamps. The light emittance pattern of the lenses is configured to illuminate at least one vertical surface and one horizontal surface below. The illuminance light level intensity over any one surface within the elongated space is determined by the number of lamps coupled to the planar retaining surface with dedicated lenses above.

The lenses are configured to direct the lamp's light in a specific light emittance pattern. In an elongated space, the horizontal light transmittance pattern is generally rectangular, wherein the central longitudinal axis of the generated pattern typically coincides with the central longitudinal axis of an aisle or a corridor.

The intensity of the light emitted through the plurality of lenses can be directed toward different regions of the elongated space surfaces. Typically, the light level and illumination uniformity ratio for an elongated walkway surface, disregarding power consumption efficacy, can be accomplished rather easily. Not so for vertical illuminance.

The average adult human eye level is approximately 5'-0" above floor. The eyes of a person looking forward in an elongated space land on vertical surfaces that are approximately 30° above and below the person's eye. Hence, the illuminance of the vertical surface/s 2'-0" above and below the human eye must be higher than other illuminance levels on the same vertical surface beyond the stated range.

Furthermore, it has been established among persons trained in the art of illumination that high light emittance angles exceeding 45° from a luminaire nadir constitute offensive glare angle. The person traversing an elongated space subject to high glare angles will experience visual discomfort and compromised visual acuity. The present innovation lens design is configured to include directing a lamp light where needed at the specified intensity and reducing or eliminating luminaire emitted offensive glare angles in an elongated space.

The present application describes an orientation specific luminaire with coupled lensed optics that can deliver a prescribed light level intensity where needed and predetermined prescribed uniformity ratios within a surface and between surfaces within an elongated space while increasing spacing between like luminaires, reducing luminaire energy consumption, and reducing apparent glare.

DETAILED DESCRIPTION

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

GENERAL DISCUSSION OF EMBODIMENTS

A luminaire's light source can be covered by an optical lens (which itself may include sub lenses) that controls the directionality of the emitted light. The light source may also be covered by a translucent protective lens, which disperses the luminaire's light in roughly a natural +/−120° light dispersion pattern of a LED lamp.

The LED luminaire with coupled LED lamps can also employ a reflector and/or a refractor. At least the refractor, or the refractor and reflector, can substitute for a protective optical lens over the LED light source. In embodiments discussed herein, both a protective lens over the LED and a refractor may be used together or separately.

The LED luminaire can have several forms including round, square, and rectangular. The decision to use one form of luminaire over another is driven by architectural, economic, and performance considerations. Among the performance considerations a designer must consider is whether each luminaire form provides for the light emittance pattern compatible with the needs of the space to be illuminated. These illumination needs can include at least one of, a horizontal and a vertical surface/s.

As recognized by the present inventor, objectives for a project to illuminate an elongated space at specified intensity levels to targeted surface/s should include using a minimal amount of energy, and generating minimum glare, while maintaining a good uniformity ratio (e.g., 3:1). To achieve these objectives, a lighting designer, when specifying a luminaire, would first need to evaluate whether the luminaire's form with its light emittance pattern is compatible with the space needs. The lighting designer may also have to consider the luminaire's orientation. Such a consideration becomes relevant where orientations of at least two like formed neighboring luminaires must be common and set in relation to the space in which the luminaires are mounted. For this reason, with at least one luminaire form, the lighting designer must consider the choice of the mechanical means of the luminaire support as it affects the associated labor component, the production time, and material costs.

The lens optics over the light source of a rectangular formed luminaire can generate a variety of light dispersion patterns; however, its architectural form imparts lighting directionality by having one horizontal central axis longer than the other horizontal central axis. Further, its installation may require more than one point of mounting support. As recognized by the present inventor, more than one mounting support point, as compared with a single support point, necessitates additional costly structural support members and requires longer installation time and thus increases the installation costs.

Lens optics over a square luminaire can also generate a variety of light dispersion patterns; however, for architectural reasons, it requires orientation alignment with other like luminaires. An advantage of the square luminaire over the rectangular luminaire, as recognized by the present inventor, is that it can be mounted from a single mounting point, and its form is directionally neutral.

Lens optics over the light source of a round luminaire are also directionally neutral. The luminaire can also be mounted from a single mounting point. Round luminaires are often used in retail and institutional spaces which are wide open, but conventional optics over round luminaires are not conventionally viewed as conducive for use in elongated spaces, mainly for their lack of directionality. The elongated spaces, for example, can be racked aisles within a big box retail space.

Corridors and aisles where rectangular, square, and round shaped luminaires are used represent a substantial portion of all real estate for retail "big box" outlets, warehousing spaces, and manufacturing spaces.

U.S. patent application Ser. No. 18/406,136, the contents of which is incorporated herein by reference, describes a mechanical orientation mounting device, which may be used with the orientation specific luminaire described herein. The present disclosure further elaborates on the mounting device's connectivity to a luminaire below it and a supporting structure above it.

A luminaire with or without orientation specific light source optics coupled to the orientation specific mechanical mounting device is able to have a user-settable alignment with a like luminaire and/or with a feature of the space in which it is disposed such as an aisleway below or a supporting structure above. Once the luminaire's orientation is set by way of setting the orientation of the mechanical mounting device, the mechanical mounting device can then be permanently secured, which in turn secures the luminaire in position. It is noted that having two cables and/or chains connecting the luminaire to a mounting device assures restoration of the luminaire's orientation to its set position under a condition where the luminaire is accidently hit by a moving object (e.g., a ladder being moved, etc.).

Further, the two suspended support mounting members provide redundant restraints, and thus can protect life and property, when one support mounting member fails. The orientation specific mechanical mounting device can be configured for a single point of connectivity to the structure above. The mounting device coupled to a luminaire can facilitate luminaire alignment regardless of the luminaire form and its optical light dispersion pattern.

In elongated spaces that include racked aisles (aisles have a floor flanked with racks/shelves or a wall on at least one side, but often on both sides), the luminaires can be tasked with illuminating the horizontal surfaces including the floor and furniture that rests on the floor, and the vertical surfaces including walls and/or face of the rack/s. In spaces intended to display merchandising product, the illuminance of the rack's vertical surface is of great importance, as this is where the merchandise is displayed and a shopper will observe it.

The merchandise is often displayed in proximity to an adult human's eye level (e.g., in an inclusive range of 3' to 7', but typically an average height of 5'). For convenience, this document will refer to eye level as being five feet above a finish floor, but the level can be anywhere between three feet and seven feet depending on the circumstances. Therefore, in elongated spaces where merchandise is displayed on racks, the luminaires are configured to provide the most intense light level/s to fall on the vertical face of the rack at about an adult human's eye level, where merchandise that is on display for sale is located. Above, and possibly below, the human eye level, the rack may include storage space for items that are housed until needed. The racked region above the rack(s) around human eye level are accessible via a lift, or ladder, by store personnel and often extend up to 30 feet or so above the finished floor.

Luminaires placed above an aisle flanked by elongated rack space are expected to deliver specified light levels at specific locations, or subregions, along the horizontal and vertical surfaces that define the aisleway. In merchandising and stocking spaces the intense light levels should illuminate vertical surface at, above and below an adult human eye level. In addition, in some applications, the luminaires may be configured to also illuminate the ceiling or support structure above.

An aspect of the presently described luminaire is that it directs its primary light source toward the floor below and/or at least one adjacent vertical surface. In at least one embodiment a plurality of luminaires with LED light sources coupled thereto are located above a racked aisle and are incrementally spaced apart from one another at predetermined distances, usually along a center plane that extends from the middle of the aisle and is parallel to at least one vertical racked wall at the edge of the aisle. Each of the luminaires' light sources are tasked with illuminating at least a portion of a vertical surface comprising the face of a rack adjacent to an aisle, and at least a portion of the aisle's floor surface.

To attain optimal efficiency, the form of a printed circuit board (PCB) that hosts the plurality of the LED lamps comes into play. The orientation of the LED lamps coupled to the PCB can differ from legacy practices, and include planar as well as non-planar topologies (e.g., curved such as parabolic surfaces, and the like). Over the LED light source (i.e., between the LEDs and the regions illuminated by the LEDs), an optical lens is positioned that directs the light toward horizontal and vertical targeted fields of illumination. The lens optionally includes a plurality of sub-lenses that can include at least one dedicated optical lens per LED. Likewise, the sub-lenses may provide the directed optics for a group of LEDs, such as 2, 3, 4 . . . 50. The group of LEDs may be linearly arranged, or grouped in two dimensional arrays if the PCB is planar, or even a 3 dimensional grouping with a PCB that is non-planar.

The present exemplary embodiment includes two crescent shaped PCB's populated with planar LED lamps. Each crescent shown in this embodiment is tasked with illuminating one or more sub fields of illumination on a vertical surface of a rack, as well as one or more sub fields of illumination of the floor of the aisle, adjacent to the lower edge of the vertical surface of the rack. In a different embodiment, the same PCB arrangement includes one or several sections. For example, a three section PCB can be configured with two sections to illuminate the racks, and the third section configured to illuminate the floor between the two racks. As a complement to the LEDs arranged on the crescent shaped PCBs, additional LEDs with optional directional, and orientation settable optics, maybe be hosted in a central hub region that is unoccupied by the pair of crescent shaped PCBs, where the crescent shaped PCBs have an arcuate shape.

The PCB that retains a plurality of LED lamps thereon may be segmented into one or several boards, wherein the board/s can have at least one of a different form, orientation, and number of light sources coupled thereto. The optical lens/es (sometimes referred to herein as "optics") disposed over the PCB retaining the plurality of lamps directs the light emitted from the plurality of the LED lamps toward a designated subfield of illumination target. The targeted subfield of illumination can have at least one of, a specified horizontal and vertical light level intensity value. A subfield of illumination is a sub region of the vertical surface or horizontal surface of the elongated space (aisleway flanked with one or more vertical structures on either or both sides of the floor of the aisleway).

The PCB is fabricated with wiring that provides controllably amounts of electricity to the plurality of the coupled LED lamps and can be configured to controllably operate an individual lamp or groups of lamps. The control of the LED lamps can be different from one another and/or in unison with one another, having optical lens/es over a single or a plurality of LED lamps. The control can be provided by hardwired circuitry (e.g., application specific integrated circuit, ASIC) or programmable circuitry such as one or more processors having one or more central processing units (CPUs) coupled to one or more memories that hold computer readable code therein that, upon execution by the one or more processors, configures the processors to control the electrical flow and illumination control of the LEDs, and/or a luminaire driver, hosted by the luminaire.

The LED lamps coupled to the PCB can differ by at least one of, shape, size, input power, color temperature, and chromaticity. The luminaire driver/s and/or a controller can drive different LED lamps and/or plurality of grouped LED lamps.

The PCB, with or without the dedicated optics, can be replaceable. The PCB can be configured either as orientation specific or non-orientation specific. A switch and/or a rotatable dial device coupled to the luminaire can be configured to manually control (or controlled electrically via a controllable motor such as a stepping motor controlled by a local controller, or a remote wireless controller) at least one aspect of the operation of at least a portion of the lamps coupled to the PCB. In addition, the light emitted can be controlled via at least one of a local/remote communication device and/or sensing device/s.

To maintain an acceptable uniformity ratio of illumination, the light pattern emitted on a subfield of illumination from at least one luminaire can overlap another subfield of illumination. The subfield of illumination can be on a horizontal surface, a vertical surface, or a combination thereof. Given the small size of LED lamps, in at least one embodiment, the orientation of each LED lamp does not have to follow the same form as the surface of the PCB. For example, legacy round PCB's with coupled LED lamps commonly distribute the lamps in concentric rings about a vertical center axis of the PCB. By contrast, in at least one embodiment the LED lamps coupled to a PCB can be arranged orthogonally. In this arrangement, the orientation of at least one side of any one square LED lamp coupled to the PCB is substantially parallel to the orientation of the rack, and at least the adjacent side of the square LED lamp is substantially perpendicularly oriented to the rack.

As will be discussed in more detail below, the present innovation uses both the concentric and the orthogonally arranged LED lamps coupled to a crescent formed PCB of a luminaire mounted above a racked aisle. The LED lamp arrangement described can apply to any form of luminaire light source retaining surface. The orthogonal arrangement of the LED light sources with their respective optical lens/es enable better design control over the zonal distribution of the light emitted by the PCB section/s.

The design of the optical lens of the orientation specific luminaire accounts for at least one of, the luminaire's mounting height from the floor, the distance between a targeted surface and at least one luminaire coupled LED light source, the horizontal and/or vertical target light level intensity specified over a subfield of illumination, offensive glare angles, and inherent optical losses for the light emitted in any one direction.

Aisle widths of elongated spaces can vary by the building use type; however, in retail, manufacturing, and distribution spaces, the width of an aisle commonly ranges from six to twelve feet. Both the vertical surfaces of the elongated space and the elongated space floor can be divided into subzones configured in relation to a luminaire mounted above. The subzones can be further divided into short, medium and long zones. These zones can further be divided into a plurality of subfields of illumination that are contiguous to one another.

The luminaire mounted above an elongated aisle space can employ zone specific lens optics configured to illuminate at least two of the subfields of illuminations. In at least one embodiment, a luminaire with a plurality of lamps can target one or several subfields of illumination, wherein a subfield of illumination near the luminaire can be illuminated by wide angle optical lens/es covering a large subfield area, while a remote subfield can be illuminated by a narrower lens optics (with higher directivity) that may cover a smaller subfield area, albeit with a higher light intensity than without the higher gain optics.

The optics of the orientation specific luminaire is configured to attain specified light levels within a subfield of illumination. The specified light level is referenced herein as the target light level intensity. The lens/es can be placed over at least one of, a single LED lamp, a plurality of LED lamps, a single LED PCB, and a plurality of PCB's. The lens/es can couple to at least one of the PCB and the heat dissipating structure of the luminaire.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION WITH REFERENCE TO DRAWINGS

Figure 1:
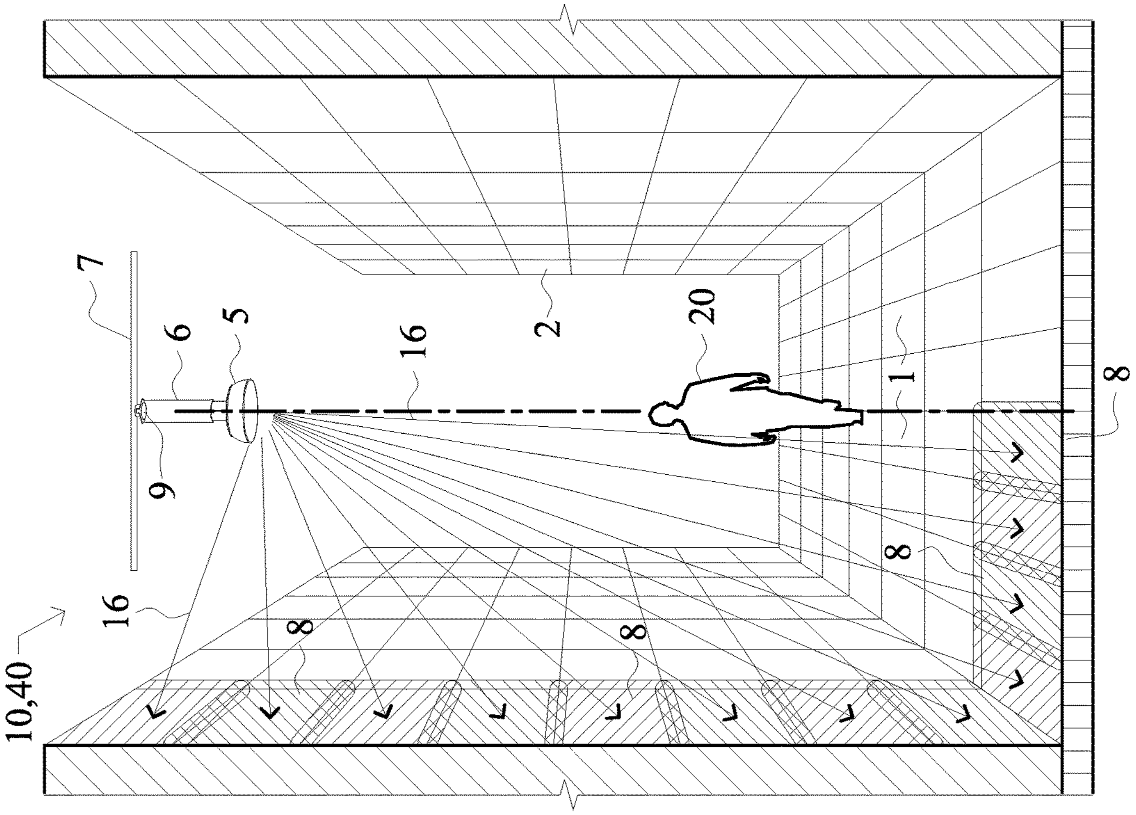
FIG. 1 shows a perspective view of an elongated space with subfields of a light emittance across a vertical wall/rack and a horizontal floor surface of an elongated space.

FIG. 1 shows a conceptual zonal diagram for a light dispersion arrangement illuminating vertical wall/rack and horizontal floor surfaces of an elongated space. The orientation specific luminaire 5 is shown suspended by two cables/chains 6 over a racked aisle 10. The cable/chain 6 suspension elements are coupled to a mechanical orientation device 9 that is secured to a support structure 7 above. It is noted that the present arrangement converts a two-point mounting to a single point mounting. The luminaire's two-point mounting enables plumbing and orienting the luminaire regardless of the luminaire form. It also assures restoring the luminaire to its original orientation following colliding with a moving object.

In a different embodiment, at least one element of the mechanical orientation device can couple the top surface of the luminaire enabling the luminaire to rotate about its central vertical axis. The single point mount can eliminate the need for a secondary support structure (not shown), saving material costs and installation production time.

The single point mount can eliminate the need for a secondary support structure (not shown), saving material costs and installation production time. The present embodiment includes an orientation specific luminaire 5 with orientation specific optics and a mechanical orientation device that enables orienting the luminaire 5 in relation to at least one of, the longitudinal axis of the racked aisle 10 and a vertical surface of a rack face 2.

FIG. 1 shows an adult human 20 traversing the racked aisle 10. Light rays emanating from the orientation specific luminaire 5 are shown directed toward subfields of illumination 8. The subfields of illumination 8 are quilted across the horizontal floor surface 1 and the vertical rack faces 2. The subfields of illumination 8 extend the full length of the racked aisle 10 wherein in a long aisle a plurality of orientation specific luminaires 5 are spaced apart at increments that enable adequate illumination coverage across the horizontal surface 1 and the vertical racked surfaces 2. In this example, the subfields are 2.5' high by 4' wide, although subfields of different dimensions may be used as well (e.g., heights varying between 6" to 6', and widths from 6" to 10').

For graphic clarity the present figure shows the light rays 16 extending away from the orientation specific luminaire across only one half of the racked aisle 40. The light rays 16 also show only one vertical slice of light rays 16 extending from the aisle floor 1 to the top tier of the racked surface 2. The light rays illuminating the targeted subfield of illumination can overlap their illumination coverage onto at least one adjacent subfield of illumination 8. It is noted that precisely overlapping the illumination coverage over the subfields of illumination 8 can improve the illumination uniformity of the entire field of illumination.

Figure 2B:
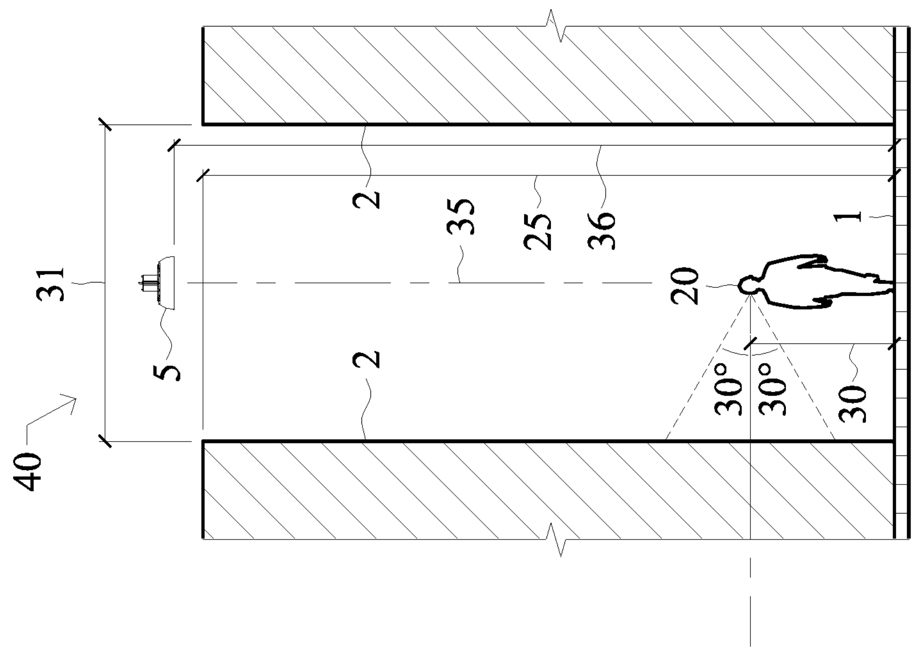
FIG. 2*b* shows a transverse section of a typical racked aisle in relation to the eye level for the typical adult human.
Figure 2A:
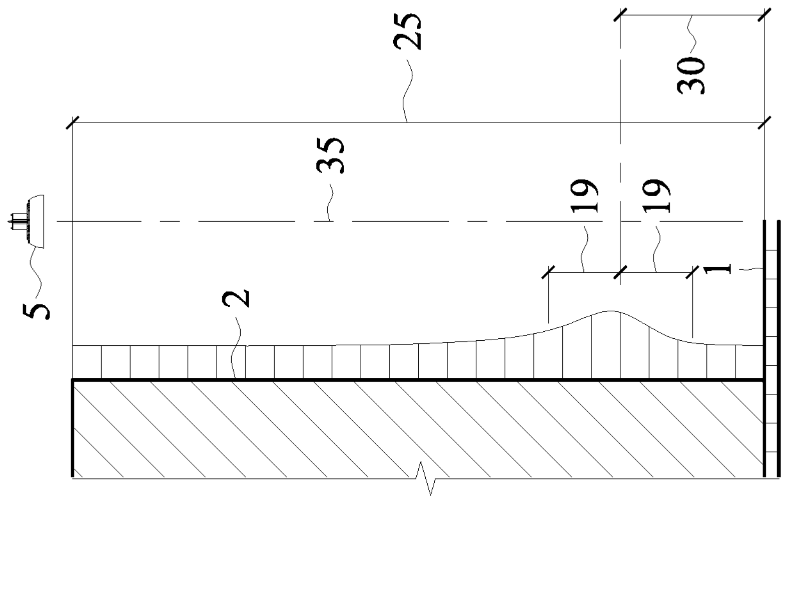
FIG. 2*a* shows a partial transverse section through a vertical surface with an illustration of an overlaid vertical light level distribution over the vertical surface in reference to eye level for a typical adult human.

FIG. 2*a* shows a partial transverse section through a vertical surface showing with a conceptual vertical light level illuminance intensity (region shown with horizontal lines therein) in reference to an average adult human eye level. FIG. 2*b* shows a transverse section of a typical racked aisle in relation to the adult human eye level.

FIG. 2*a* shows the intensity of the vertical illuminance on a vertical surface within an elongated space peaking at an adult human eye level 30, or adjacent to and above and/or below an adult human eye level, where the highest light intensity is needed. The specific lensed optics of the orientation specific luminaire 5 mounted above the horizontal aisle surface 1 is configured to direct light from nadir outwardly in an asymmetrical pattern. In this example, the light intensity distribution has a peak level in a subzone (subfield) that is a height occurring at the height of eye level of an average adult human. The shape around the peak is generally Gaussian in distribution (i.e., bell curve), which is a result of overlapping light patterns directed toward the height of eye level of an average adult human, although having some dispersion about the peak level defined by a standard deviation 19 around the peak level as set by an overlapping of a relatively large number of dispersion patterns from respective LED/lens groups (e.g., pairs). A light level intensity below the inclusive range is no less than 0.6 times the light level intensity within the inclusive range.

The exit angles of the emitted light, the lens light dispersion optical pattern, and the LED lamp intensity are set in relation to the height 25 of the vertical surface 2 that the orientation specific luminaire 5 is tasked to illuminate. FIG. 2*a* shows a ratio that is limited to maximum to minimum ratio of 3:1 between the highest and the lowest vertical illuminance on the vertical surface 2 vertically measuring across the full height 25 of the vertical surface 2 from the floor 1 up. For example, if the specified vertical light level target on a vertical surface of an elongated space is set for 30FC at the height of an adult human eye level within the inclusive range, the lowest vertical light level measured vertically across the same surface from the floor surface 1 up does not fall under 10FC—as shown in FIG. 2*a*.

It is noted that the structure of the present embodiment re-directs light from a light source from a horizontal planar surface of the orientation specific luminaire 5 onto a vertical surface 2 of an elongated space, concentrating the light emitted along a horizontal band 19 at a specific height above a floor 30 while maintaining an excellent maximum to minimum uniformity ratio of 3:1 across the entire surface of the vertical surface 2. The vertical uniformity ratio discussed can be constructed as a base line for good design. The lensed optics of the present orientation specific luminaire can be configured to provide better lighting uniformity ratios.

FIG. 2*b* shows a transverse section of a typical racked aisle in relation to the adult human eye level. Visually pairing the side-by-side FIGS. 2*a* and 2*b*, one can see that the adult human eye 30 has a cone of vision of approximately 60° from the horizontal—30° up and 30° down.

Therefore, the eye coverage of an adult human looking straight at a vertical surface 2 of an elongated space illuminated by an orientation specific luminaire 5 falls on a higher vertical illuminance band extending across a portion of the vertical height 25 of the vertical surface 2. The vertical illuminance band width can vary based on the width of the horizontal aisle 1 and/or the placement of the orientation specific luminaire 5 above. However, the illumination ratios pertaining to the vertical illuminance on the vertical surface 2 of the elongated space can remain unchanged.

Figure 3A:
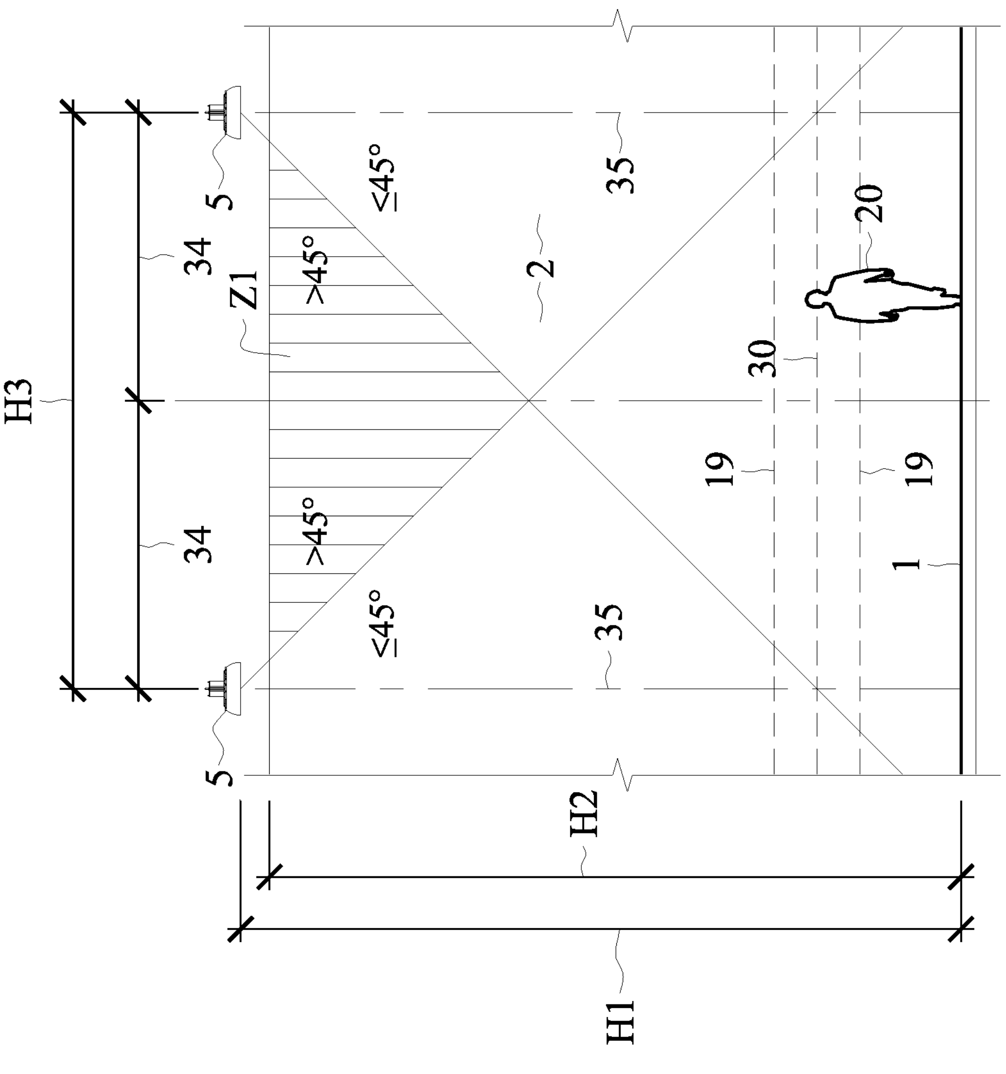
FIG. 3*a* shows light exit angles above a luminaire nadir of a luminaire suspended above a surface of an elongated space.
Figure 3B:
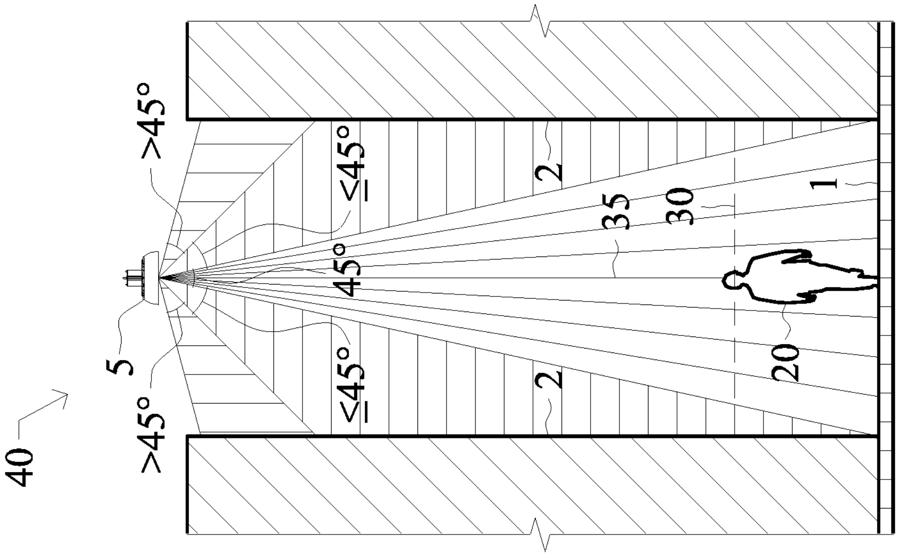
FIG. 3*b* shows the light exit angles of the same luminaire as in FIG. 3*a* although taken transversely across the elongated space.

FIG. 3*a* shows light exit angles above a luminaire nadir of a luminaire suspended above a surface of an elongated space. FIG. 3*b* shows the light exit angles of the same luminaire taken transversely across elongated vertical space.

FIG. 3*a* shows two orientation specific luminaires 5 mounted above a horizontal aisle surface 1 illuminating a vertical surface 2. The luminaires' spacing H3 and mounting height H1 shown corresponds to the luminaires' light source output and the lensed optics arrangement. The present figure shows 45° to nadir 35 as the highest light exit angle from the luminaire 5. Light emitted by the luminaire 5 and directed toward the horizontal aisle surface 1 is configured to be glare free (<46° exit angle) and to uniformly illuminate the aisle surface 1.

A scaled adult human traversing the horizontal surface of the elongated space aisle 1 is shown juxtaposed next to a high vertical surface 25. The vertical surface 2 represents a racked surface. The adult human eyes level 30 above the horizontal aisle surface is approximately 5'-0" as shown in dashed line.

The adult human cone of vision is approximately 60°. The eyes of an adult human looking straight at the rack 2 face perceive a vertical area centered at approximately the human eye level 30. The intense illuminance band extending the length of the vertical surface 2 face is formed by the adjacent surfaces above/below (dashed lines 19) the human eye level 30. The portion of the surface within the upper and lower dashed lines of horizontal band 19 is an illustration of the inclusive range.

The figure illustrates that by dividing the light emitted through each luminaire 5 lensed optics into a horizontal surface and a vertical surface, the overall luminaire efficiency is increased. Limiting the horizontal surface 1 optical light exit angle of the luminaire 5 to a maximum of 45° reduces luminaire's optical losses and eliminates veiling glare, wherein the balance of the downwardly directed light of the luminaire 5, that includes high exit angle light rays, can then be directed away from the eyes of an adult human traversing the horizontal surface of the aisle 1 toward the vertical racked surface 2.

FIG. 3*a* shows the light exit angles of the same luminaire as shown in FIG. 1 taken transversely across elongated vertical space. The figure shows the luminaire 5 mounted over an elongated space of a racked aisle 1. The luminaire 5 shown is positioned at approximately a mid-point of the aisles' width having the same illumination requirement on the faces of the racks 2, as the racks are equal in height. In a different embodiment (not shown), the light pattern emitted from one side of an orientation specific luminaire 5 can be different from the light emitted by the opposite side of the luminaire.

The distance between the two luminaires 5 mounted above an elongated space has financial implications for material, installation, energy, and maintenance costs. Therefore, spacing luminaires as far apart as possible is desirable.

The optical lenses of the orientation specific luminaire are configured to provide the light level intensity where needed, maintain lighting uniformity, and reduce glare while positioned far apart. It is noted that the H3/H1 ratio (known as the spacing to mounting height ratio) of the present orientation specific luminaire coupled to the lensed optics can be at least 1.35.

FIG. 3*b* shows a symmetrical light emittance pattern (distribution) of two luminaires' light emittance angles in reference to their respective nadirs 35. The luminaires are arranged in relation to at least one of, the vertical surfaces of the racks' face 2 and the central longitudinal axis of the elongated space racked aisle 1. The luminaire's lensed optics is shown to divide the emitted light into a component tasked with illuminating the horizontal surface 1 and a component tasked with illuminating the vertical surface 2 of the elongated space.

The component tasked with illuminating the vertical surface 2 is further divided into two horizontal bands, one that illuminates vertical surfaces equal to or less than a 45° exit angle in relation to nadir, referred to herein as the low angle band, and the other band where the light exit angles in relation to nadir exceed 45° referred to herein as the high angle band. It is noted that the high angle band is higher than the eye level of an adult human 30.

Further, a review of FIGS. 3*a* and 3*b* shows that the distance to the mid-point of a pair of luminaires 5 spaced apart H3 is relatively short in relation to nadir. That said, the proximity from the luminaire's nadir to the high band mid-point 34 vertical surface 2 is relatively short (sec FIG. 5*a* crosshatched triangle). While high angle optics emitted through a horizontal planar surface facing downwardly can incur greater losses, the small area and the proximity to the luminaire 5 nadir 35 can offset these losses. In at least one different embodiment (not shown) at least one secondary non-horizontal planar surface with at least one light source coupled with a lensed optics can illuminate a vertical surface 2 more efficiently having a lesser light exit angle.

Figure 4:
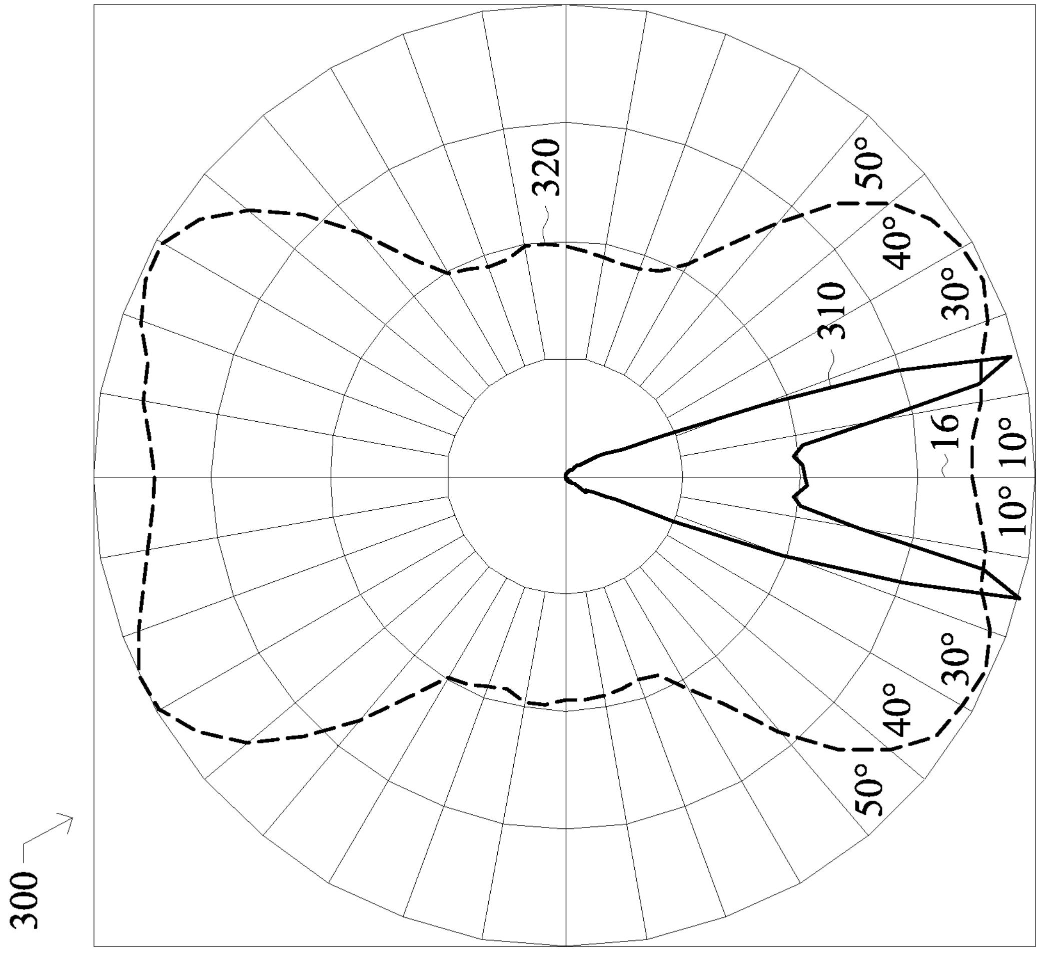
FIG. 4 is a polar diagram of the light intensity emitted by lensed optics of the orientation specific luminaire, with one contour in dashed lines being a light intensity envelope horizontal (looking sideways) to the lensed optics, and the other contour in solid line being vertical to the lens optics (looking down).

FIG. 4 is a polar diagram 300 of the optical light distribution pattern from the lensed optics of the orientation specific luminaire. The polar diagram 300 a vertical component and a horizontal component of the light distribution pattern. The vertical light distribution pattern 310 shows the light distribution in vertical plane from the luminaire and the horizontal light distribution pattern 320 from the luminaire. The diagram is divided into four quadrants. The luminaire (not shown) is positioned at the vertex common to the four. Concentric rings are shown arranged around the vertex. Each ring shows a different luminosity intensity of the light emitted. Rings closer too the vertex have less light intensity emitted than rings closer to a periphery of the polar plot. Radial lines originating outside the vertex indicate polar angles by degree wherein nadir is pointed down. The polar angle dividing lines are shown at 10° increments.

The polar diagram of the lensed optics of the orientation specific luminaire shows that peak vertical light emittance from the luminaire in relation to nadir 16 is between 20° and 20° (e.g., 15°) on either side of nadir 16 transversely to the elongated space longitudinal axis. The radiation pattern in the vertical component is highly directional as it has no up-light component and a lower light emittance intensity between nadir 16 and 10° at both sides of nadir 16.

The polar diagram of the lensed optics of the orientation specific luminaire shows that the horizontal light emittance pattern from the luminaire is roughly rectangular, with no null zones, wherein the longitudinal long axis of the pattern generated coincides with the long longitudinal axis of the elongated space or is parallel to at least one adjacent vertical surface. The pattern also shows relative equal light emittance intensity along the long "legs" of the rectangular pattern. The light emitted along the long legs is configured to illuminate the vertical surfaces of the elongated space.

Figure 5B:
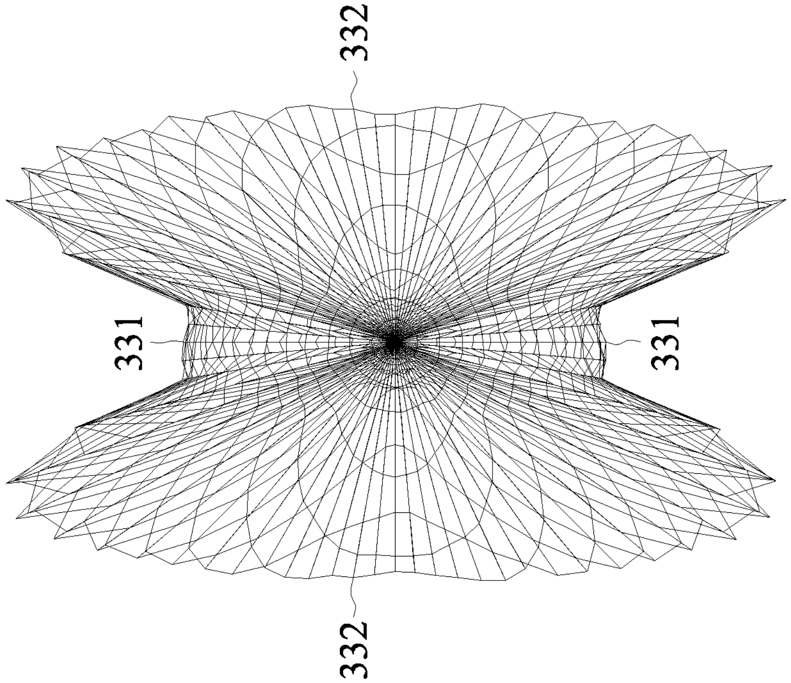
FIG. 5*a* and FIG. 5*b* show bottom and side views of the lensed optics light distribution pattern.
Figure 5A:
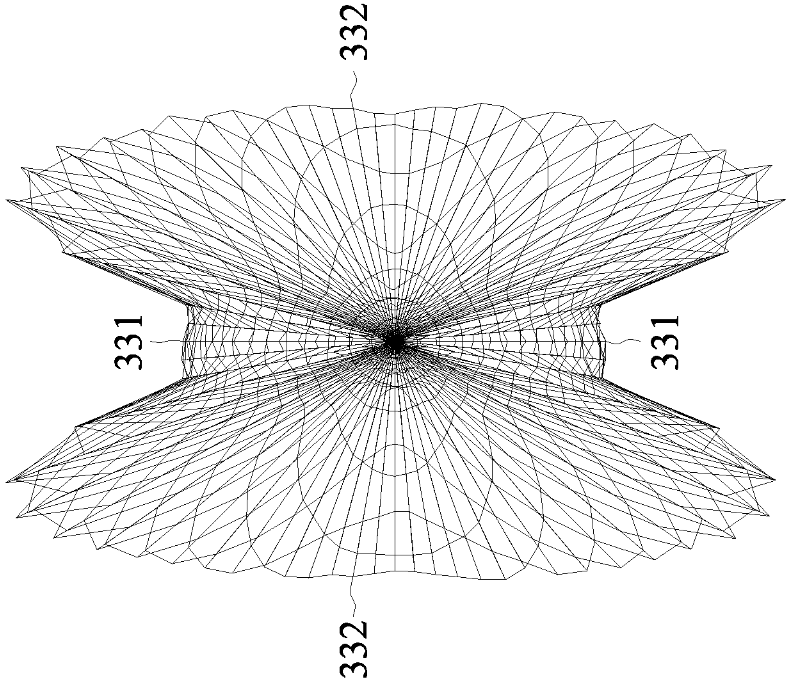

FIGS. 5*a* and 5*b* show the bottom and side views of the lensed optics light distribution pattern.

FIG. 5*a* shows a bottom view of a 3D wire frame web 330 representing the light emittance pattern for light emitted through the optical lenses of the orientation specific luminaire. The lines drawn represent both light emittance intensity and directionality. The "butterfly" pattern shows asymmetrical light distribution. The luminaire optics is configured to be placed over a walking aisle of an elongated space. The "wings" of the "butterfly" extending outwardly from the center show the vertical surfaces directed light 332.

The present figure shows the "wings" extending outwardly and away from one another in the opposite direction. This emission pattern shown infers that each of the "wings" is configured to illuminate vertical surfaces at an opposite side to one another. In a different optical arrangement, where an only one sided "butterfly" wing is used, the luminaire light emittance is directed toward a single vertical surface. In at least one lens optical embodiment, the other side of the lens can have a different light distribution.

The floor directed light 332 of the present wire frame 3D web is shown between the two "wings". The floor directed light 332 intensity outwardly is shorter than the vertical surface directed light 332. The present innovation restricts the light emitted over the horizontal surface of the elongated space to eliminate/reduce apparent glare by limiting the light exiting the luminaire to below 45° from the luminaire's nadir. As a result, the light emission intensity pattern is shorter.

As with the horizontal light emittance pattern shown in FIG. 4, the generated 3D wire frame web form of the present figure shows the outer sides of the "butterfly" "wings" relatively long and straight. The linearity of the "wings" form indicates a relatively consistent light emission intensity across the illuminated vertical surfaces.

FIG. 5*b* shows a top view of a wire frame web 3D representing the light emittance pattern for light emitted through the optical lenses of the orientation specific luminaire. The light intensity pattern from the above view is substantially like the view from below shown in FIG. 5*a*.

Figure 6B:
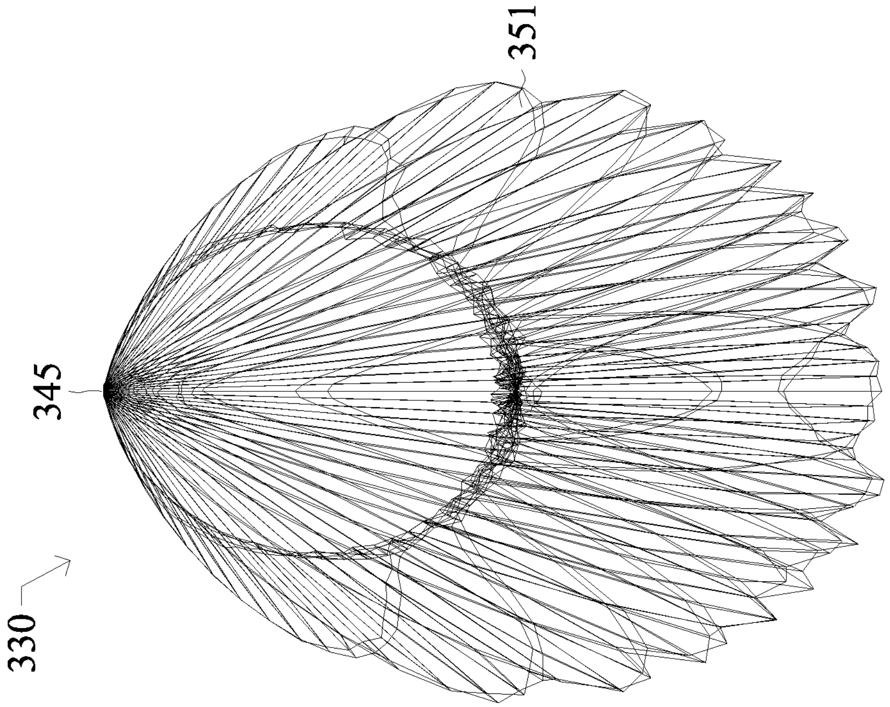
FIG. 6*a* and FIG. 6*b* show a longitudinal cross view and a parallel side view of the lensed optics light distribution pattern.
Figure 6A:
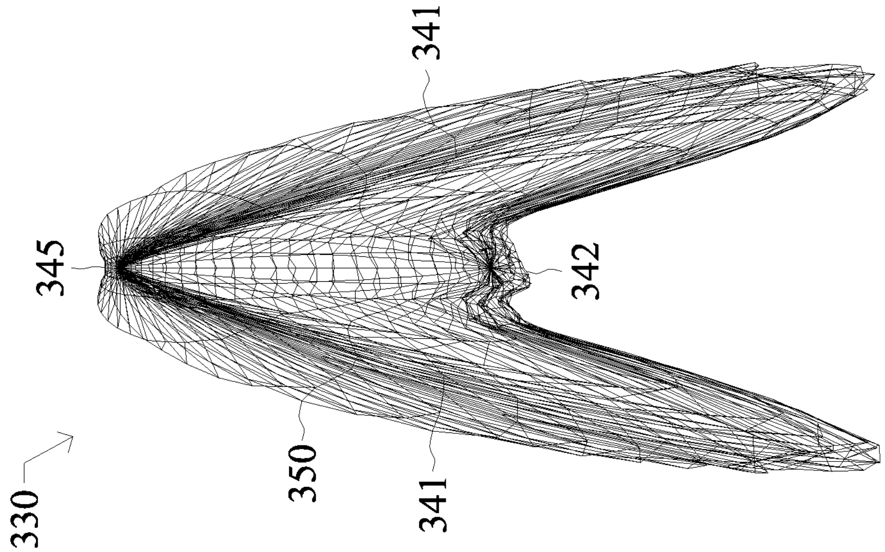

FIGS. 6*a* and 6*b* show the cross elongated space section and a longitudinal section through the lensed optics 3D wire frame web of the luminaire, respectively.

FIG. 6*a* shows the light source position 345 above the cross-emission pattern 350 3D wire frame web 330. The cross pattern shows the profile of two legs of light emission beams 341 extending down and away from the light source position 345. Each of the legs is configured to illuminate a vertical surface in the elongated space. Between the two legs, the intensity of light emittance is shown shorter. The bottom directed light beam profile 342 is configured to primarily illuminate the horizontal surface below the luminaire.

FIG. 6*b* shows a longitudinal section through the lensed optics 3D wire frame web of the luminaire parallel with the longitudinal long axis of the elongated space. The light source position 345 is shown at the top of the wire frame web 330. The vertical ellipsoidal form of the light emitted shows a wide longitudinal emittance pattern 351 when placed side by side next to the FIG. 6*a* cross section view. The darkened smaller ellipse outline represents the light intensity pattern directed toward the floor surface below.

Figure 7A:
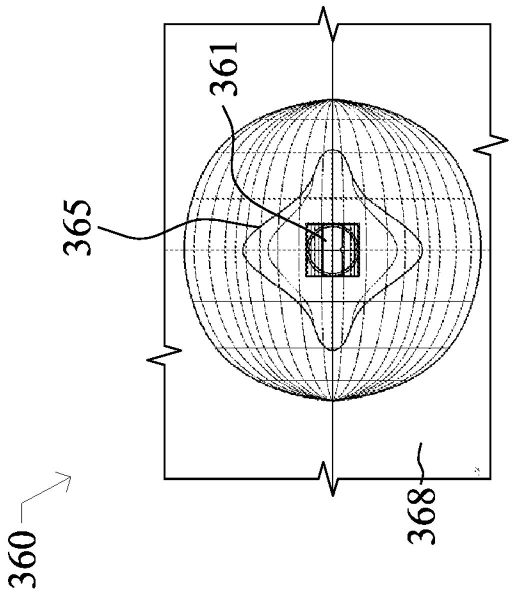
FIG. 7*a* is an upward view of a single optical lens.

FIG. 7*a* is an upward view of the structure of an optical lens (domed lens 360) that is disposed over a lamp 361 (e.g., LED) mounted on a lamp retaining surface 362 of a substrate (lens board structure 368). The LED 361 is mounted at the center such that light emitted from the LED 361 propagates through the material of the optical lens and is redirected by the optical lens according to the light emittance patterns discussed above with respect to FIG. 4 through FIG. 6*b*. The optical lens structure 365 from the upward view in FIG. 7*a* has a rounded outer perimeter, and 4-pointed star inner shape with rounded edges, as seen in FIG. 7*a*. The domed structure can be coupled to at least one more like dome structure to form an optical lensed board structure 368.

The lens board structure 368 with the plurality of lamp dedicated lenses can be mounted to a luminaire structure positioned precisely over the lamp the individual lens is dedicated to. A luminaire can employ at least one lens board structure. The lens board structure 368 can include domed lenses that are at least one of, a symmetrical light distribution pattern, an asymmetrical light distribution pattern, and a combination of both light distribution patterns thereof.

Figure 7B:
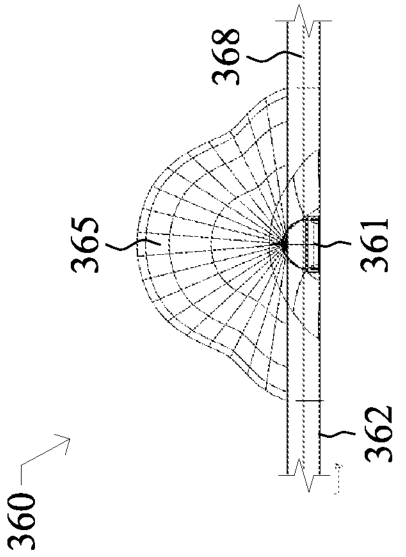
FIG. 7*b* is a view of the optical lens that is from a direction parallel to the vertical sidewalls of the walkway.

FIG. 7*b* is an elevation viewed from a direction that is parallel to the vertical rack faces 2 (FIG. 1). The optical lens profile in this view is somewhat bell-shaped and optimized to direct light over the height of the adjacent rack. Directing light in this manner creates a maximum illuminance at eye level with a smooth decrease over the top of the rack.

Figure 7C:
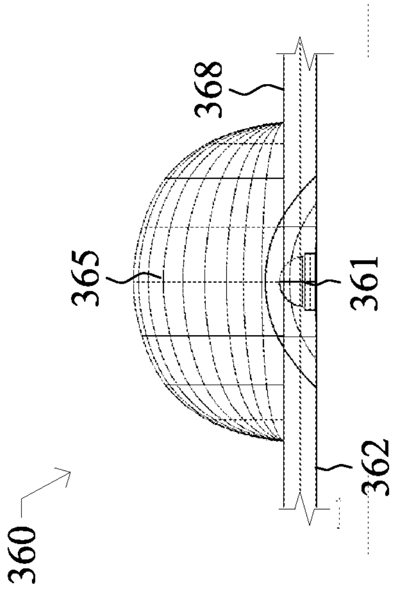
FIG. 7*c* is a view of the optical lens orthogonal to that of FIG. 7*b*.

FIG. 7*c* is an elevation viewed perpendicular to the view in FIG. 7*b* and has a shape that is optimized for glare control in a vicinity of the person 20 (FIG. 1).

Figure 7D:
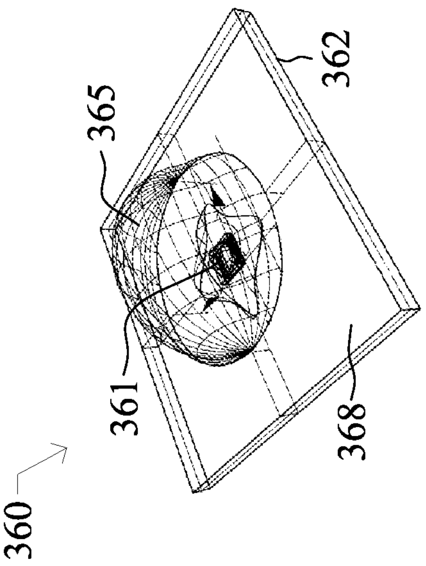
FIG. 7*d* is a perspective view of single optical lens.

FIG. 7*d* is a perspective view of the optical lens with lines showing the contours of the outer periphery of the optical lens structure 365, and the internal contours showing the opening that allows the lens to be placed over the LED 361 shown in the center thereof.

Figure 8B:
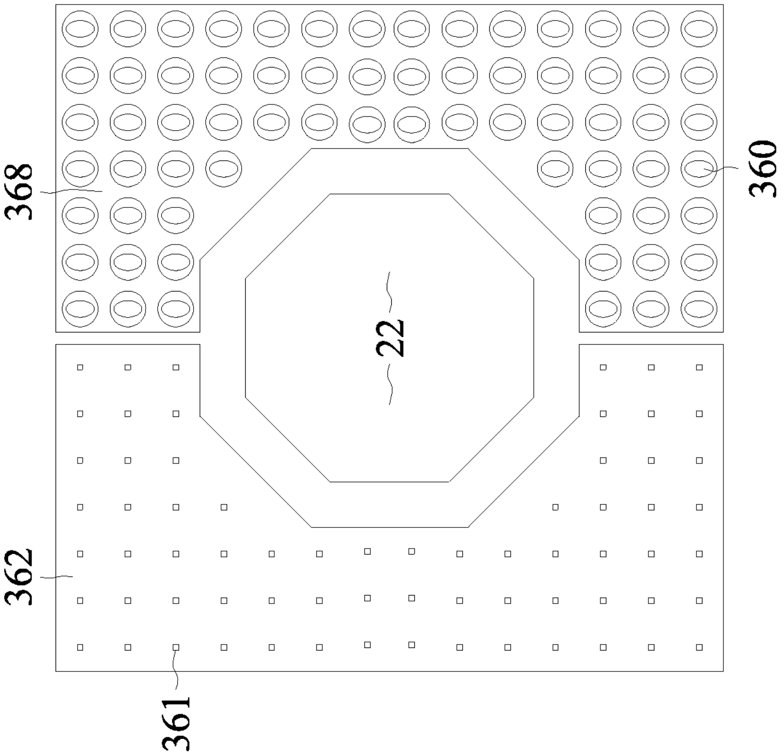
FIG. 8*a* and FIG. 8*b* show an exemplary planar lamp retaining surfaces populated by lamps with lensed optic above a round form and a square form luminaire respectively
Figure 8A:
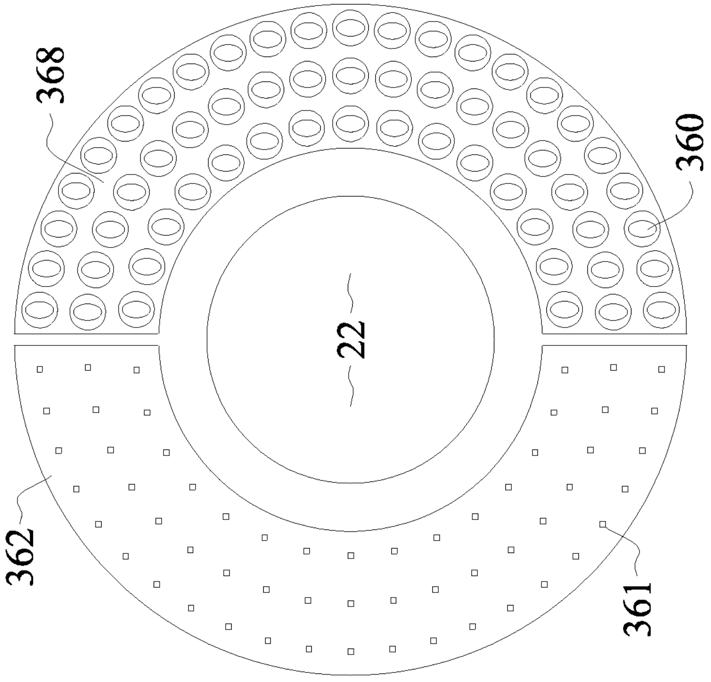

FIGS. 8*a* and 8*b* show an exemplary planar lamp retaining surfaces populated by lamps with lensed optic above a round form and a square form luminaire respectively.

The light source retaining board with lensed optics 24 above, of the orientation specific and/or the non-orientation specific luminaire 5 can take any form. The use of reduced form light source in conjunction with dedicated reduced lens optics is a relatively new optical design approach. This design approach marks a departure from art that relies on a light source retaining board with a lens optical distribution of narrow, medium, and wide light patterns.

The lenses used with the luminaire 5 may be customized for an application while capable of illuminating at least one vertical and horizontal surface/s meeting light levels targeted.

FIG. 8*a* shows two optical lens systems arranged about a central axis of a round opening: the lens system on the left shows LED lamps 361 that are not covered by lenses (although in practice some or all would be covered by lenses), and the lens system on the right is covered by lenses 360 on a lens board structure 368. The lens systems in FIG. 8*a* can couple to two crescent shaped PCBs 15,362 with LED lamps arranged in correspondence to coupled optical lenses 360. In at least one embodiment, at least one first optical lens 360 can be configured to direct light toward a surface near by the luminaire and at least one second lens is configured to direct light to a remote surface wherein the optical arrangement of the at least one first optical lens 360 differs from the optical design of the at least one second optical lens 360.

The present figure orientation specific lens optical light emittance pattern is pre-configured in relation to at least one horizontal surface and at least one adjacent vertical surface, and a plurality of same design lenses placed over their respective dedicated lamps illuminate the targeted surfaces at the targeted illuminance levels where needed.

FIG. 8*b* shows a single square formed optical lens system that fits over a PCB 15, 362 with a polygonal-shape (e.g., square, rectangular, polygonal, etc.). Similarly to the crescent shaped lensed optics of FIG. 8*a*, the lens shown can be comprised of a plurality of lenses configured to direct the LED light emitted through the lens toward a pre-configured field of illumination below and/or at the side of the luminaire. On the left, the lens board structure 368 and lens 360 are omitted for clarity and to show a spatial correspondence to the lamps 361 and the lenses 360.

The present figure orientation specific lens optical light emittance pattern is pre-configured in relation to at least one horizontal surface and at least one adjacent vertical surface, and a plurality of same design lenses placed over their respective dedicated lamps illuminate the targeted surfaces at the targeted illuminance levels where needed.

Figure 9B:
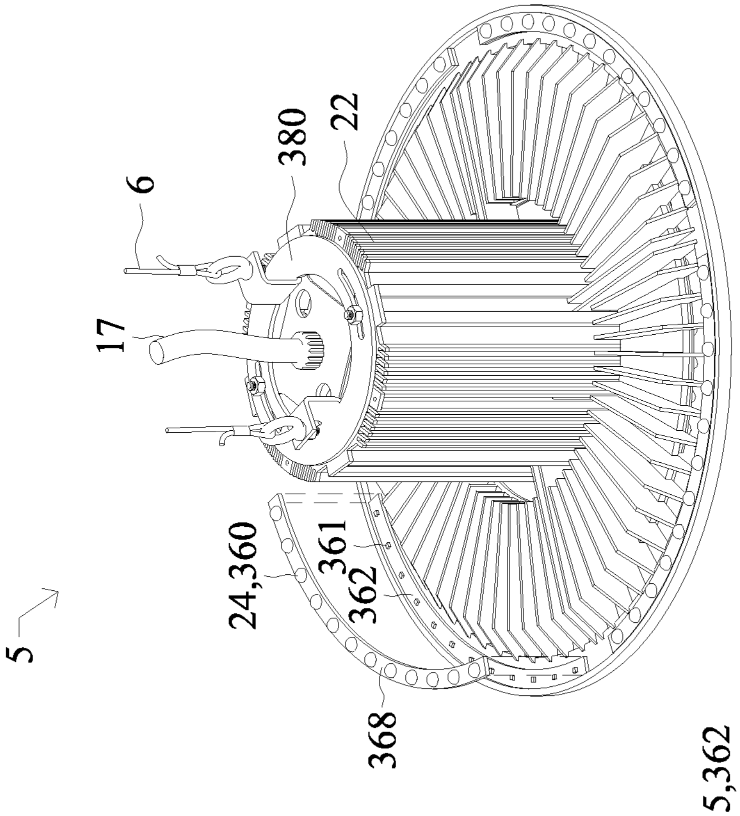
FIG. 9*a* and FIG. 9*b* show respective bottom perspective and top perspective views of an exemplary luminaire with optical lenses coupled to the luminaire's floor facing and ceiling facing surfaces.
Figure 9A:
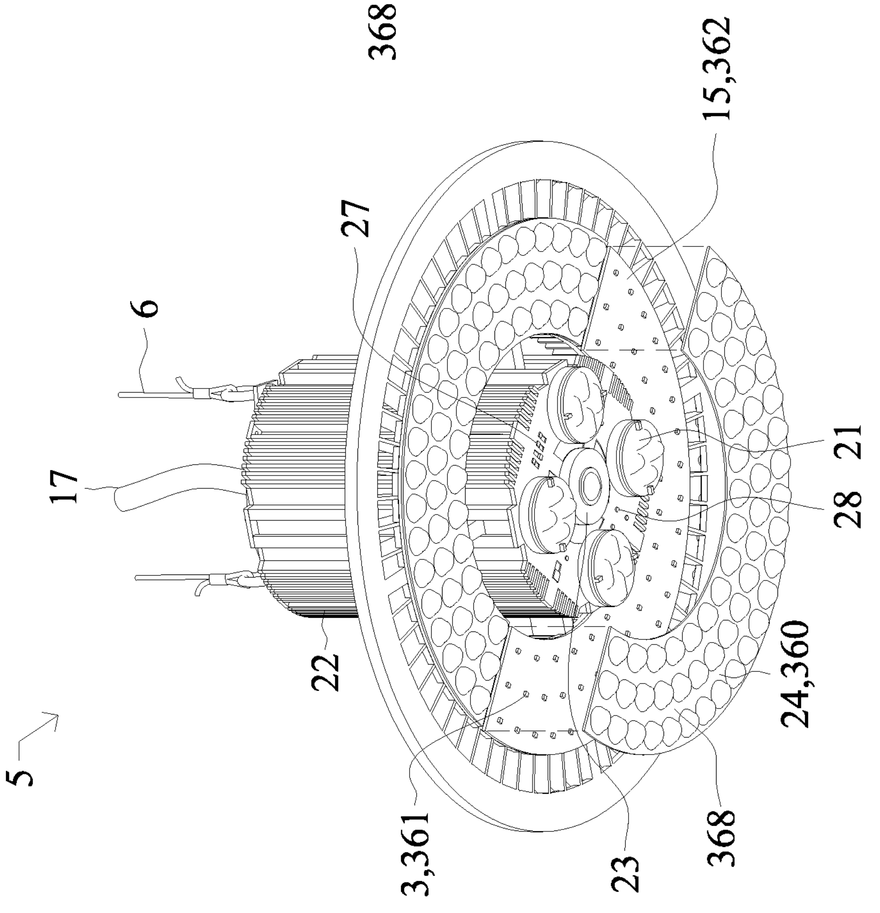

FIGS. 9*a* and 9*b* show bottom perspective and top perspective views of an exemplary luminaire with optical lenses coupled to the luminaire's floor facing and ceiling facing surfaces respectively.

FIG. 9*a* shows a worm eye perspective view of a round form orientation specific luminaire coupled to orientation specific lensed optics. A dedicated lensed optics 24, 360 is shown for each light source 3, 360. In another embodiment a lensed optics 24, 360 can be placed over a plurality of light sources 3, 360 (not shown). Further, a plurality of light sources 3, 360 can couple the PCB 15, 360 of at least one of different, size, watt input, color rendition, and chromaticity (not shown).

The light sources 3, 361 coupled to the PCB 15,362 can be energized by at least one circuit (not shown). The plurality of circuits can control the light emitted by an individual PCB 15, 362 or individual lights on the PCB 15, 362. For example, during off hours, LEDs that emit UV light can decontaminate a space. The PCB 15, 362 with its coupled light sources 3, 361 and lensed optics can be detachable and replaceable by different lensed optics 24, 360 as needed.

FIG. 9*a* also shows the luminaire 5 with an electronic device housing 22, a cable/chain 6, an emergency egress light source 21, switches 27, an indicator light 28, and an IOT device (with a processor and memory, and optional a transceiver) as an occupancy sensor/camera 23.

FIG. 9*b* shows a top-down perspective view of the round form orientation specific luminaire 5 coupled to ceiling facing lensed optics 368. The up-light component of the luminaire 5 can be used with the orientation specific luminaire and the non-orientation specific luminaire. A wide-angle lensed optic 24, 360 placed on the lamps 3, 361 can uniformly illuminate a ceiling above.

The present embodiment shows at least two lamps 3, 361 covered by the lensed optics 24, 360 at opposite side of the luminaire 5 structure. Having the lamps 3, 361 positioned above and away from the electronic device housing 22 of the luminaire 5 eliminates the risk of shadowing a portion of the ceiling. Further, placing the up-light lamps 3, 361 at the luminaire's 5 outer perimeter having a through air gap between these up-light lamps 5 and the downlight directed lamp 5 light helps cool the lamps 5 during operation.

FIG. 9*b* shows the top surface of the orientation specific luminaire 5 coupled to a rotational orientation hub 380. The luminaire 5 rotates about its central vertical axis, secured to the mounting rotational hub 380, to optimally illuminate at least one of, a vertical surface and a horizontal surface within the elongated space.

Other elements shown coupled to the luminaire 5 include a mounting cable/chain 6, a power and/or data conductor 17, and the luminaire's electronic device housing 22.

ELEMENT LIST

1. Horizontal Aisle Surface/Floor
2. Vertical Surface/Rack Face
3. Light Source
4. Heat Sink
5. Orientation Specific Luminaire
6. Cable/Chain
7. Support Structure
8. Array Target/Subfield of Illumination
9. Mechanical Orientation Mounting Device
10. Racked Aisle
11. Extender Arm
12. Rotational Disk
13. Alignment Mechanical Device Flange
14. Reflector/Refractor
15. PCB
16. Light Ray
17. Power and/or Data Conductor
18. Alignment Bolt
19. Boundaries of inclusive range
20. Adult Human
21. Emergency Egress Light Source
22. Electronic Device Housing
23. O. Sensor/Camera, transceiver
24. Lensed Optics
25. Vertical Surface Height
27. Switch
28. Indicator Light
30. Adult Human Eye Level
31. Aisle Width
32. Luminaire Spacing
33. Luminaire Spacing Mid-point
35. Nadir
36. Luminaire Mounting Height
40. Elongated Space
300. Polar Curve Diagram
310. Vertical Polar Curve
320. Horizontal Polar Curve
330. 3D Wire Frame
331. Floor directed Luminosity
332. Side directed Luminosity
341. Side Directed Beam Profile
342. Bottom directed Beam Profile
345. Light Source Position
350. Cross Emittance pattern
351. Longitudinal Emittance Pattern
360. Domed Lens
361. Lamp
362. Lamp Retaining Surface
365. Lens Structure
368. Lens Board Structure
380. Rotational Mounting Hub Obviously, numerous modifications and variations of the present disclosure are possible in light of the above teachings. It is therefore to be understood that within the scope of the appended claims, the disclosure may be practiced otherwise than as specifically described herein.

The invention claimed is:

1. An orientation specific luminaire for illuminating a space from above an aisle, the orientation specific luminaire comprising:

a downward facing side that faces a floor of the aisle, and has a predetermined orientation set in relation to at least one of a longitudinal axis of the aisle and a first vertical surface that defines a first side of the aisle;

a light source including a plurality of lamps distributed across a planar structure that is located on the downward facing side of the orientation specific luminaire, the plurality of lamps having a substantially common orientation on the planar structure, and an orientation specific lens includes a plurality of lens elements that respectively cover the plurality of lamps, light that passes through each of the plurality of lens elements exhibits a substantially common light distribution pattern with respect to the floor and the first vertical surface, an aggregate light intensity distributed along the first vertical surface and across the floor is generated from an aggregated quantity of the plurality of lamps and directed by the plurality of lens elements, wherein the orientation specific lens is settably repositionable about a central axis of the orientation specific luminaire, and a central longitudinal axis of a horizontal light pattern of the aggregation of light is aligned in parallel with at least one of the first vertical surface and the floor, and an intensity of the light emitted through the orientation specific lens is set in relation to a distance of the light source to at least two targeted subfields of illumination on the floor and at least two vertical subfields of illuminations on the first vertical surface.

2. The orientation specific luminaire of claim 1, wherein at least one of the at least two targeted subfields of illumination on the floor are adjacent horizontal subfields, or at least two vertical subfields of illuminations on the first vertical surface are adjacent vertical subfields.

3. The orientation specific luminaire of claim 1, wherein an average vertical illuminance of a subfield of illumination located on a face of the first vertical surface at adult human eye level is greater than an average vertical illuminance of a subfield of illumination located on the first vertical surface 7'-0" above the floor.

4. The orientation specific luminaire of claim 1, wherein each lens element of the plurality of lens elements has an asymmetrical shape.

5. The orientation specific luminaire of claim 1, wherein the lens elements are configured to direct light rays above 45° from nadir toward the first vertical surface.

6. The orientation specific luminaire of claim 1, wherein at least two of the plurality of lens elements are fabricated in a single structure.

7. The orientation specific luminaire of claim 6, wherein the single structure includes two lenses with different optical properties.

8. An orientation specific luminaire having an orientation specific lens, the orientation specific luminaire comprising:

a downward facing side that faces a floor of the aisle, and has a predetermined orientation set in relation to at least one of a longitudinal axis of the aisle and a first vertical surface that defines a first side of the aisle, and a light source including a plurality of lamps distributed across a planar structure that is located on the downward facing side of the orientation specific luminaire, the plurality of lamps having a substantially common orientation on the planar structure, the orientation specific lens comprising:

a plurality of lens elements that respectively cover the plurality of lamps, light that passes through each of the plurality of lens elements exhibits a substantially common light distribution pattern with respect to the floor and the first vertical surface, an aggregate light intensity distributed along the first vertical surface and across the floor is set by an aggregate quantity of the plurality of lamps with and the plurality of lens elements, wherein the orientation specific lens is settably repositionable about a central axis of the orientation specific luminaire, and a central longitudinal axis of a horizontal light pattern of the aggregation of light is aligned with the longitudinal axis of the aisle, and upon energizing the orientation specific luminaire, an average illuminance light level within an inclusionary range on a face of the first vertical surface exceeds an average illuminance light level measured below the inclusionary range and an average illuminance light level measured above the inclusionary range, the inclusionary range includes an average eye level of an adult human with respect to the floor and predetermined distances above and below the average eye level of the adult human, the average eye level of the adult human being in an inclusive range of 4 feet through 7 feet above the floor.

9. The orientation specific luminaire of claim 8, wherein a maximum to minimum horizontal uniformity ratio of illumination on the first vertical surface is no greater than 1.3:1.0.

10. The orientation specific luminaire of claim 8, wherein a maximum to minimum vertical uniformity ratio of illumination on the first vertical surface is no greater than 4.0:1.0.

11. The orientation specific luminaire of claim 8, wherein light exit angles from the orientation specific lens of the luminaire relative to a nadir of the luminaire that are greater than 45° are less than 5% of a total luminaire light flux directed downwardly.

12. The orientation specific luminaire of claim 8, wherein a maximum vertical light level measured at the face of the first vertical surface is between 2'-0" above and below the average eye level of the adult human.

13. The orientation specific luminaire of claim 8, wherein an average horizontal light level ratio measured at 36" above a center of the aisle and an average vertical light level measured at 60" above the floor at the face of the first vertical surface is less than 2.2.

14. The orientation specific luminaire of claim 8, wherein a light emittance pattern of the orientation specific lens is set to correspond with at least a width of the floor, a height of the first vertical surface, and an average light emitted intensity level across a height on the first vertical surface adjacent to the floor.

15. An orientation specific luminaire comprising:

a downward facing side that faces a floor of the aisle, and has a predetermined orientation set in relation to at least one of a longitudinal axis of the aisle and a first vertical surface that defines a first side of the aisle, the aisle having an overhead ceiling, the orientation specific luminaire being mounted to a support structure above;

a first light source including an array of lamps distributed across a first planar structure that is located on the downward facing side of the orientation specific luminaire, the array of lamps having a substantially common orientation on the planar surface;

a second light source that includes a plurality of lamps covered by lamp dedicated lenses coupled to a second planar surface, the first light source includes at least two lamps positioned opposite to one another in proximity to an outer parameter of the second planar surface, the second planar surface is coupled to the downward facing side of the orientation specific luminaire, wherein an orientation of the plurality of lamps is substantially the same, a light distribution pattern generated by light emitted through the lamp dedicated lenses is substantially the same, a directionality of the light emitted through at least one lens of the lamp dedicated lenses is configured in relation to floor and the first vertical surface, an intensity of downwardly directed light emitted by the orientation specific luminaire is produced by an aggregate quantity of the plurality of lamps covered by the lamp dedicated lenses, the orientation specific luminaire is configured to be oriented about central vertical axis thereof so that a longitudinal central axis of an elongated horizontal light emittance pattern generated by the optical lenses aligns with a longitudinal elongated central axis of the aisle, and upon energizing the orientation specific luminaire, the first light source illuminates a surface above the luminaire and the second light source illuminates the floor below the luminaire and the first vertical surface adjacent to the floor.

16. The orientation specific luminaire of claim 15, wherein the second planar surface is positioned below the first planar surface.

17. The orientation specific luminaire of claim 15, further comprising a coupled switch configured to control at least one of a light source color temperature, a light source intensity, and the first source, or the second light source.

18. The orientation specific luminaire of claim 15, further comprising at least one egress light source that is coupled to a housing of the luminaire.

19. The orientation specific luminaire of claim 15, further comprising an orientation specific hub that is coupled to the orientation specific luminaire.

20. The orientation specific luminaire of claim 15, wherein the first light source and the second light source are configured to couple to any of the first planar surface or second planar surface without optically sacrificing light emittance intensity and directionality.

21. An orientation specific lens structure comprising:

a plurality of lens elements that respectively cover a plurality of lamps, the plurality of lamps are distributed across a planar structure that is located on a downward facing side of an orientation specific luminaire, the plurality of lamps having a substantially common orientation on the planar structure, light that passes through each of the plurality of lens elements exhibits a substantially common light distribution pattern with respect to a floor and the first vertical surface of an aisle over which the luminaire is disposed, an aggregate light intensity distributed along the first vertical surface and across the floor is generated from an aggregated quantity of the plurality of lamps and directed by the plurality of lens elements, wherein an orientation specific lens is settably repositionable about a central axis of the orientation specific luminaire, and a central longitudinal axis of a horizontal light pattern of the aggregation of light is aligned in parallel with at least one of the first vertical surface and the floor, an intensity of the light emitted through the orientation specific lens is set in relation to a distance of the light source to at least two targeted subfields of illumination on the floor and at least two vertical subfields of illuminations on the first vertical surface, and an average vertical illuminance of a subfield of illumination located on a face of the first vertical surface at adult human eye level is greater than an average vertical illuminance of a subfield of illumination located on the first vertical surface 7'-0" above the floor.

22. The orientation specific lens structure of claim 21, wherein at least one of the at least two targeted subfields of illumination on the floor are adjacent horizontal subfields, or at least two vertical subfields of illuminations on the first vertical surface are adjacent vertical subfields.

23. The orientation specific lens structure of claim 21, wherein no more than 5% of overall of light emitted through the orientation specific lens at angles exceeding 45° from nadir falls on the floor.

24. The orientation specific lens structure of claim 21, wherein each lens element of the plurality of lens elements has an asymmetrical shape.

25. The orientation specific lens structure of claim 21, wherein the lens elements are configured to direct light rays above 45° from nadir toward the first vertical surface.

26. The orientation specific lens structure of claim 21, wherein at least two of the plurality of lens elements are fabricated in a single structure.

27. The orientation specific lens structure of claim 26, wherein the single structure includes two lenses with different optical properties.

28. The orientation specific lens structure of claim 21, wherein a maximum to minimum horizontal uniformity ratio of illumination on the first vertical surface is no greater than 1.3:1.0.

29. The orientation specific lens structure of claim 21, wherein a maximum to minimum vertical uniformity ratio of illumination on the first vertical surface is no greater than 4.0:1.0.

30. The orientation specific lens structure of claim 21, further comprising another plurality of lens elements disposed over another plurality of lamps disposed on another planar structure.

* * * * *